UNITED STATES PATENT OFFICE.

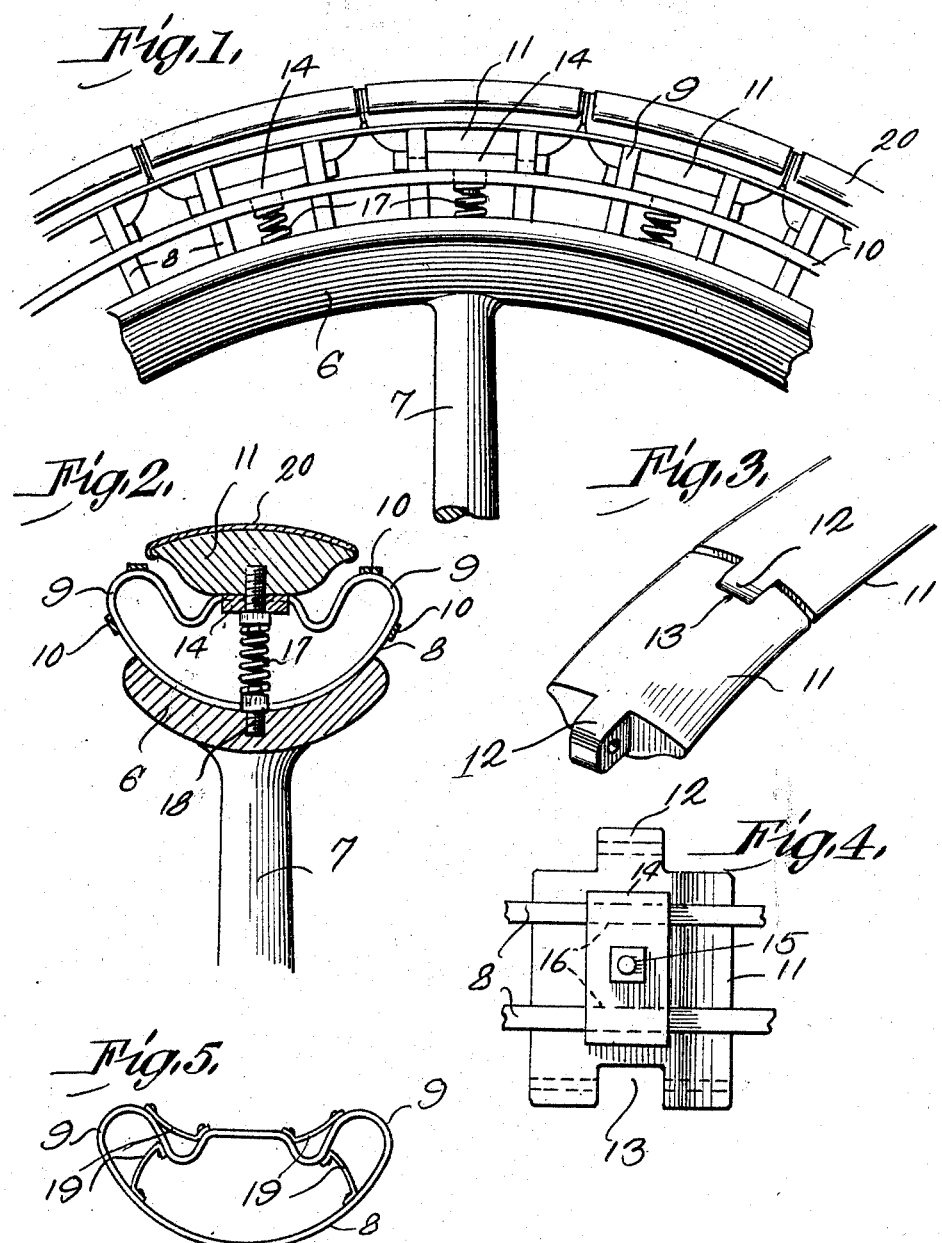

FLOYD L. MURDOCK, OF CLEVELAND, OHIO.

SPRING-TIRE.

1,303,366. Specification of Letters Patent. Patented May 13, 1919.

Application filed May 20, 1918. Serial No. 235,530.

*To all whom it may concern:*

Be it known that I, FLOYD L. MURDOCK, a citizen of the United States, residing at Cleveland, in the county of Cuyahoga and State of Ohio, have invented certain new and useful Improvements in Spring-Tires, of which the following is a specification.

This invention relates to resilient tires for vehicle wheels, having for its primary object to provide an improved tire which shall possess all of the advantages common to the use of the pneumatic tire and yet which avoids the disadvantageous features of such devices.

A further object of the invention is to provide a tire of simplified and improved construction which shall possess resiliency sufficient to withstand shocks and jars to which the wheel will be subjected, and which has its various movable parts so constructed and arranged upon the rim of the wheel as to minimize the opportunity for wear or breakage.

A further object of the invention is to provide an improved spring tire which has its parts so arranged as to prevent dismemberment of the same when the wheel upon which the tire is mounted is used as a power or driving wheel.

Still further objects reside in providing a tire of the character stated possessing comparatively few and readily assembled parts, which may be constructed at comparatively little expense and which will prove thoroughly practical and efficient in use.

With these objects in view, together with others which will appear as the description proceeds, the invention resides in the novel formation, combination, and arrangement of parts, all as will be described more fully hereinafter, illustrated in the drawings, and particularly pointed out in the claims.

In the drawings:—

Figure 1 is a side elevation of a portion of a conventional form of wheel rim and illustrating the application of a tire constructed in accordance with the invention.

Fig. 2 is a sectional view taken through the wheel rim illustrated in Fig. 1, parts of the improved tire being shown in section.

Fig. 3 is a detail perspective view of a pair of the tread members and illustrating the manner in which the same are assembled.

Fig. 4 is a bottom plan view of one of the tread members and illustrating the manner in which the laterally disposed supporting springs are secured thereto, and Fig. 5 is an elevation of a slightly modified form of one of the resilient supporting members.

Referring now more particularly to the drawings, 6 indicates a wheel rim or felly, a spoke 7 being shown connected therein in the usual manner. By referring particularly to Fig. 2 of the drawings it will be observed that the outer periphery of the rim 6 is concave, thus providing an annular channel extending entirely around the rim.

The rim 6 has arranged upon the outer face thereof and in the concave channel a plurality of laterally disposed yieldable supporting members for the tread to be hereafter described. These supporting members are indicated generally as 8, and comprise flat springs, bent upon themselves as shown particularly in Figs. 2 and 5, the said spring members being rounded at their lower portions so as to seat within the concave outer surface of the rim 6. These spring members provide shoulder portions 9, and these shoulder portions are connected to resilient bands 10 extending entirely around the tire. It will be observed that the members 8 are arranged in spaced relation around the tire, and the bands 10 hold the same in proper assembled position.

The tread for the improved tire comprises a plurality of plates or links 11, each of which is adapted to be supported upon a pair of the spaced resilient supporting members 8. These links are each provided at one end with a projection 12, and at its opposite end with a recess 13 to receive the projection upon the next adjacent link. It will be observed that the recesses and projections are arranged midway between the lateral edges of the links, and when the links are properly fitted together connecting pins may be passed through the projections 12. By so connecting the various links, it is obvious that a continuous tread for the tire is provided, and the said links may be moved inwardly or outwardly to conform to the shape of the ground over which the wheels travel.

Each of the links 11 is connected to its supporting spring members 8 by a plate indicated at 14. Each of the plates 14 is secured at its central point to the corresponding point of the link 11 and upon the inner face thereof by a set screw indicated at 15. Each of the plates is also provided upon its outer face with laterally disposed grooves 16 adapted to receive the laterally disposed spring members 8. When the screws 15 have been properly adjusted, the plates 14 will be moved into close engagement with the inner faces of said links 11, and the spring members 8 will be confined within the recesses 16 adjacent the ends of the said plates.

To assist in properly maintaining the parts in proper position and to relieve the spring members 8 of some of the pressure to which they will be subjected, expansion springs 17 are provided. These springs are arranged between the rim of the wheel and the tread members and are engaged at their outer ends over protruding studs on the heads of the set screws 15. The inner ends of the springs 17 are engaged in a similar manner over suitable heads upon the outer extremities of screws 18 engaged in the felly 6.

In Fig. 5 of the drawings there is shown a slightly modified form of the resilient members 8, wherein the same are each equipped with reinforcing or bracing members 19. These members may be formed of resilient metal so as to absorb some of the shock to which the tire will be subjected, in addition to reinforcing the members 8.

If desired, the ground engaging surfaces of the links 11 may be coated with rubber pads indicated at 20. In addition to assisting in absorbing the shock to which the tread members will be subjected, these pads will deaden the noise incident to the travel of the wheel over the ground or pavement.

From the foregoing it is obvious that I have provided a tire of extremely simple construction, which will efficiently absorb the shock delivered to the same in travel over rough ground, which has its various parts so constructed and assembled as to minimize the opportunity for wear or breakage. Such a tire possesses all the advantages incident to the use of the inflatable tires, and yet avoids the disadvantages such as punctures or blow outs.

The foregoing description and the drawings have reference to what may be considered the preferred, or approved form of my invention. It is to be understood that I may make such changes in construction and arrangement and combination of parts, materials, dimensions, etc., as may prove expedient and fall within the scope of the appended claims.

Having thus fully described my invention, what I claim as new and desire to secure by Letters Patent, is:—

1. In a spring tire for wheels, a plurality of springs disposed laterally of the rim of the wheel, a tread member connected to each pair of said springs, the said tread members being pivotally connected together at their ends, and bands connecting the said laterally disposed spring members.

2. In a spring tire for wheels, springs arranged in spaced relation upon the rim of said wheel and disposed laterally thereof, a tread link supported upon each pair of said springs, a plate for each link, the said plates being provided with spaced recesses to receive said spring members, a screw for securing each plate to its respective tread member, springs being disposed between said screw members and the rim of said wheel, and the said tread members being connected together.

3. In a spring tire for wheels, a plurality of laterally disposed springs on the rim of said wheel, a tread member for each pair of said springs, retaining plates for holding said springs to said tread members, a screw for each plate, a screw in said rim radially alined with the said plate screw, expansion springs interposed between said screws, and pads upon the outer faces of said tread members.

In testimony whereof I affix my signature in presence of two witnesses.

FLOYD L. MURDOCK.

Witnesses:
PATRICK GALLAGHER,
THOS. B. GOFF.

Copies of this patent may be obtained for five cents each, by addressing the "Commissioner of Patents, Washington, D. C."